(12) United States Patent
Methven (10) Patent No.: US 10,486,795 B2
(45) Date of Patent: Nov. 26, 2019

(54) PROPELLER BLADES HAVING ICEPHOBIC COATING

(71) Applicant: GE Aviation Systems Limited, Gloucestershire (GB)

(72) Inventor: Paul Nicholas Methven, Churchdown (GB)

(73) Assignee: GE Aviation Systems Limited, Gloucestershire (GB)

( * ) Notice: Subject to any disclaimer, the term of this patent is extended or adjusted under 35 U.S.C. 154(b) by 376 days.

(21) Appl. No.: 15/401,140

(22) Filed: Jan. 9, 2017

(65) Prior Publication Data

US 2017/0217565 A1 Aug. 3, 2017

(51) Int. Cl.
*B64C 11/20* (2006.01)
*B64F 5/60* (2017.01)
*B64F 5/40* (2017.01)
*B64D 15/00* (2006.01)

(52) U.S. Cl.
CPC ............ *B64C 11/205* (2013.01); *B64D 15/00* (2013.01); *B64F 5/40* (2017.01); *B64F 5/60* (2017.01)

(58) Field of Classification Search
CPC . B64C 11/205; B64F 5/60; B64F 5/40; B64D 15/00; B64D 15/16; F01D 5/288
USPC ........................ 416/241 R; 244/134 R, 134 E
See application file for complete search history.

(56) References Cited

U.S. PATENT DOCUMENTS

| | | | | |
|---|---|---|---|---|
| 6,623,243 | B1 * | 9/2003 | Hodos | A61B 5/0496 416/61 |
| 7,875,354 | B2 * | 1/2011 | Mitchell | F01D 5/282 237/28 |
| 8,052,387 | B2 * | 11/2011 | Xu | F04D 29/005 416/241 A |
| 8,834,126 | B2 * | 9/2014 | Hansen | B23P 9/04 29/458 |
| 8,851,858 | B2 * | 10/2014 | Towkan | B64D 15/00 416/241 R |
| 2007/0231156 | A1 * | 10/2007 | Hong | B64F 5/40 416/241 R |

(Continued)

FOREIGN PATENT DOCUMENTS

GB 2483672 A 3/2012

OTHER PUBLICATIONS

Combined Search and Examination Report issued in connection with corresponding GB Application No. 1601676.8 dated Jul. 14, 2016.

(Continued)

*Primary Examiner* — Richard A Edgar
*Assistant Examiner* — Topaz L. Elliott
(74) *Attorney, Agent, or Firm* — McGarry Bair PC (57) ABSTRACT

A propeller blade for rotation about a hub assembly is provided, wherein the propeller blade defines a radial direction along its length from a blade root to a blade tip, the propeller blade including a radially inner region, a radially outer region located between the blade root and the blade tip at a position where rotational forces on the blade are sufficient, in use, to remove ice from an uncoated blade, a coating disposed at least along a leading edge of the propeller blade, the coating including an icephobic material, wherein the coating extends along the propeller blade from the radially inner region to the radially outer region. The coating overlays a substrate portion of the propeller blade defining a color visually indicative of wear of the coating.

20 Claims, 6 Drawing Sheets

(56) References Cited

U.S. PATENT DOCUMENTS

| | | | |
|---|---|---|---|
| 2008/0159870 A1* | 7/2008 | Hong | B23P 6/007 |
| | | | 416/224 |
| 2012/0082559 A1* | 4/2012 | Guglielmin | B82Y 30/00 |
| | | | 416/241 R |
| 2012/0156049 A1* | 6/2012 | Hong | B23P 6/007 |
| | | | 416/224 |
| 2012/0163981 A1* | 6/2012 | Hong | F01D 5/288 |
| | | | 416/224 |
| 2013/0052031 A1* | 2/2013 | Towkan | B64C 11/205 |
| | | | 416/241 R |
| 2013/0163848 A1* | 6/2013 | Ulbricht | G06T 7/001 |
| | | | 382/141 |
| 2016/0122034 A1* | 5/2016 | Bortoli | B64D 41/007 |
| | | | 416/142 |
| 2018/0179420 A1* | 6/2018 | Ibsen | B32B 5/022 |

OTHER PUBLICATIONS

Extended European Search Report and Opinion issued in connection with corresponding EP Application No. 17153387.0 dated Aug. 16, 2017.

Great Britain Examination Report issued in connection with corresponding GB Application No. 1601676.8 dated Oct. 16, 2018.

* cited by examiner

PROPELLER BLADES HAVING ICEPHOBIC COATING

BACKGROUND

Contemporary turbo-prop engine aircraft can include one or more propellers attached to wings of the aircraft. Propellers fitted to aircraft that are approved for flight into known icing conditions must include provisions to prevent unacceptable levels of ice accumulation on the propeller blades. Ice build-up on the propeller blade affects the aerodynamic efficiency of the blade. Thus, limiting the amount of ice build-up or accumulation increases aerodynamic efficiency. Conventional aircraft can include an electrical heater system to provide cyclic heating of the blades to control the build-up, accumulation, or shedding of ice.

BRIEF DESCRIPTION

In one aspect, a propeller blade includes a radially inner region located between a propeller blade root and a portion of a length of the propeller blade, a radially outer region located between the radially inner region and a propeller blade tip, and a coating disposed at least along a leading edge of the propeller blade over the radially inner region and at least a portion of the radially outer region, wherein the coating includes an icephobic material. A first substrate portion defining a first color is located within the radially inner region and a second substrate portion defining a second color is located within the radially outer region.

In another aspect, a method of inspecting a propeller blade includes inspecting a radially inner region of the propeller blade, located between a blade root and fifty percent of a total length of the propeller blade, wherein the radially inner region of the propeller blade includes an icephobic coating overlying a first substrate having a first color, inspecting a radially outer region, located between the radially inner region and the blade tip of the propeller blade, wherein at least the portion of the radially outer region includes the icephobic coating overlying a second substrate having a second color, identifying a portion of the propeller blade wherein at least one of the first color or the second color has been revealed, comparing the identified portion of the propeller blade to an inspection criteria, and when the comparison of the identified portion of the propeller blade satisfies the inspection criteria, initiating at least one of a maintenance operation or replacement of the propeller blade.

In yet another aspect, a propeller blade includes a radially inner region located between a blade root and fifty percent of the total length of the propeller blade, a radially outer region located between the radially inner region and a blade tip of the propeller blade, where the radially outer region is located on the propeller blade where rotational forces on the propeller blade are sufficient, in use, to remove ice from an uncoated blade, and a coating including an icephobic material disposed at least along a leading edge of the propeller blade over at least a portion of the radially inner region and at least a portion of the radially outer region. A first substrate portion defining a first color is located within the radially inner region, a second substrate portion defining a second color is located within the radially outer region, and the coating defines a third color, different from the first color and the second color, and wherein the coating is selected to reveal at least one of the first or second colors in response to wear.

DETAILED DESCRIPTION

The various aspects described herein are related to preventing or reducing build-up, accumulation, or shedding of ice on propeller blades. Embodiments of the disclosure can be implemented in any environment, apparatus, or method for preventing or reducing ice on a set of propeller blades, regardless of the function performed by the propeller blades. By way of non-limiting example such propeller blades can be utilized on aircraft. Thus, the remainder of this applications focuses on such an environment.

Figure 1:
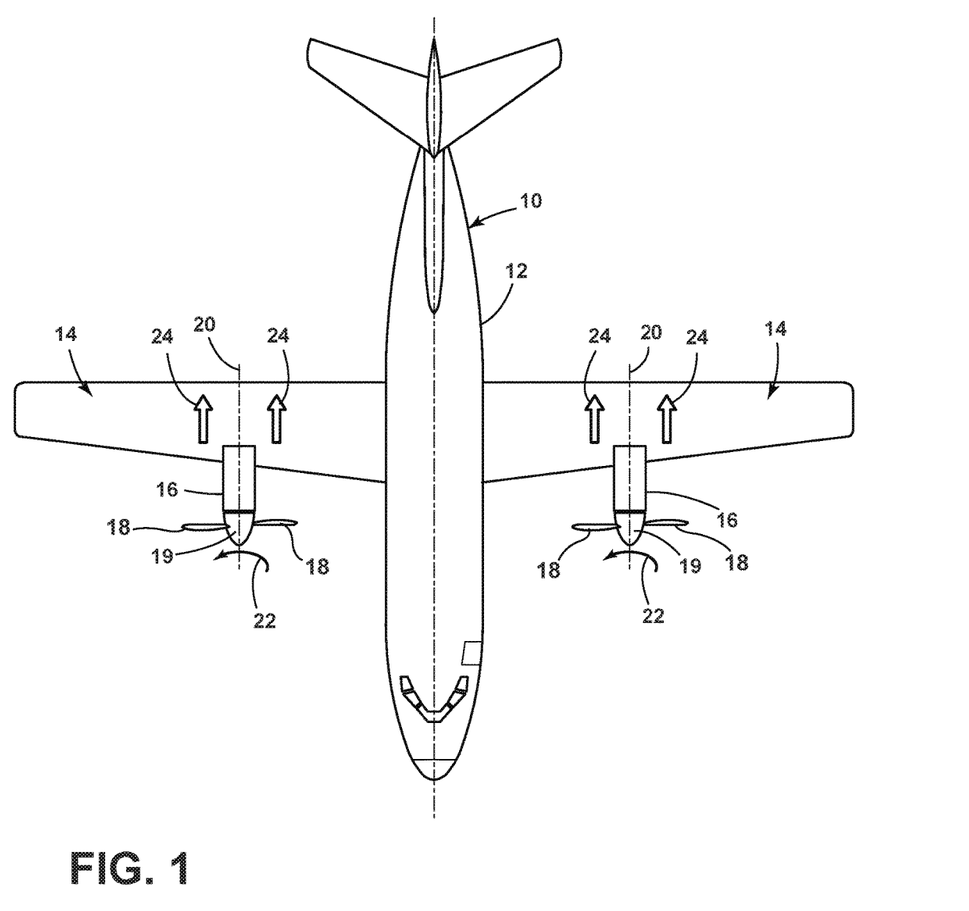
FIG. 1 illustrates an example schematic top view of an aircraft having wings and propellers in accordance with various aspects described herein.

FIG. 1 depicts an aircraft 10 having a fuselage 12 and wings 14 extending outward from the fuselage 12. The aircraft 10 can include at least one turbo-prop engine 16 coupled to the aircraft 10, shown as a set of engines 16 coupled with the opposing wings 14. The turbo-prop engine 16 can include a set of propeller blades 18 coupled with the engine 16 at a rotatable hub assembly 19, such that the engine 16 drives the rotation 22 of the propellers about an axis of rotation 20. The propeller blades 18 can further be configured or angled relative to the axis of rotation 20 such that the rotation 22 of the propeller blades 18 generates thrust (illustrated as arrow 24) for the aircraft 10. While an aircraft 10 having two turbo-prop engines 16 has been illustrated, embodiments of the disclosure can include any number of engines 16 or propeller blades 18, or any placement of the engine 16 or blades 18 relative to the aircraft. Additionally, the rotation 22 of the propeller blades 18 is provided for understanding of the embodiments of the disclosure. Embodiments of the disclosure can include alternative directions of rotation 22 of the propeller blades 18, or embodiments wherein a set of turbo-prop engines 16 rotate propeller blades 18 in the same or opposing directions.

Figure 2:
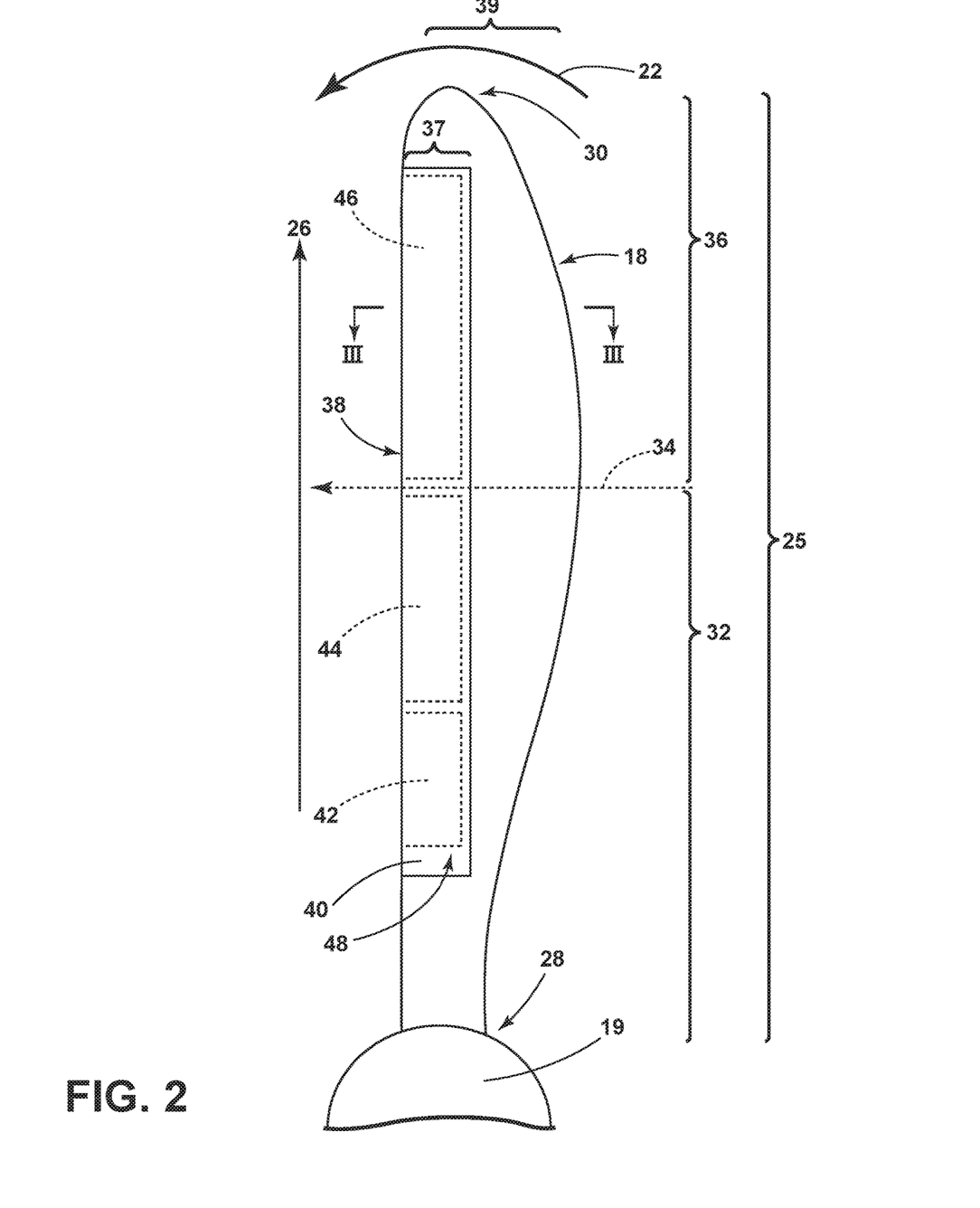
FIG. 2 is a perspective view of a propeller blade in accordance with various aspects described herein and that can be included in the aircraft of FIG. 1.

FIG. 2 illustrates an example embodiment of the propeller blade 18 and hub 19, in accordance with various aspects described herein. As shown, the propeller blade 18 includes a total radial length 25 and defines a radial direction 26 extending radially outward from a blade root 28, wherein the blade 18 couples with the rotatable hub assembly 19, to a blade tip 30. In this sense, the radial direction 26 extends normally to the rotatable hub assembly 19. The propeller blade 18 can also include a radially inner region 32 located between the blade root 28 and approximately fifty percent of the total radial length 25. The fifty percent of the total radial length 25 is illustrated as dotted line 34. A radially outer region 36 located between the radially inner region 32 and the blade tip 30. While the radially inner region 32 is described as located between the blade root 28 and approximately fifty percent of the total radial length 25 of the blade 18, alternative configurations of the blade 18 can include that the inner region 32 is defined to include more or less of the total radial length of the blade 18. For example, the radially outer region 36 can include approximately fifty to seventy percent of the total radial length 25 of the blade 18 in the radial direction 26. While the example described includes a radially inner region 32 located between the blade root 28 and approximately fifty percent of the total radial length 25, non-limiting embodiments of the disclosure can be included wherein the radially inner region 32 is located between the blade root 28 and approximately thirty percent of the total radial length 25. Additionally, non-limiting embodiments can include configurations wherein the radially outer region 36 can include approximately thirty to seventy percent of the total radial length 25 of the blade 18.

At least a portion of a leading edge 38 of the propeller blade 18, can include a coating 40, for example, extending from the leading edge 38 along at least a portion 37 of a total chord length 39 of the blade 18. As used herein, the term "leading edge" of the propeller blade 18 includes the edge of the blade 18 extending parallel with the radial direction 26 of the blade 18, and leading the blade 18 in the direction of rotation 22. Also as used herein, the term "chord length" is the length of the blade 18 normal to the radial direction 26 of the blade 18. The coating 40 can be disposed on the propeller blade 18 and extend from the leading edge 38 along at least a portion 37 of the total chord length 39. While the coating 40 has not been shown as being included on an entirety of the total chord length 39, it will be understood that it can be. Further, the coating 40 can extend over at least a portion of the total radial length 25 including at least a portion of the inner region 32 and the outer region 36. While the coating 40 has not been shown as being included along an entirety of the total radial length 25, it will be understood that it can be.

The propeller blade 18 can further include at least one blade substrate. For purposes of exemplary illustration a first blade substrate 42 and a second blade substrate 44 have been illustrated as being located along the leading edge 38 of at least a portion of the inner region 32. The first blade substrate 42 has been illustrated as being positioned radially inward from the second blade substrate 44, with respect to the radial direction 26. The propeller blade 18 can additionally include a third blade substrate 46 located along the leading edge 38 of at least a portion of the outer region 36. The first, second, and third substrates 42, 44, 46 can define a respective first, second, and third color, wherein the first, second, and third colors can be similar to, different from, visually distinguishable from, or selected based on the other substrate 42, 44, 46 colors. In one non-limiting example, the first substrate 42 color can be blue, the second substrate 44 color can be red, and the third substrate 46 color can be green. The first, second, or third substrates 42, 44, 46 can be included in the propeller blade 18 itself or can alternatively be included as a portion of the coating 40. In one non-limiting example, the substrate 42, 44, 46 could be manufactured from colored neoprene rubber.

While the first and the second substrates 42, 44 are illustrated within the inner region 32 and a third substrate 46 is illustrated within the outer region 36 of the propeller blade 18, it will be understood that this need not be the case. Embodiments of the disclosure can be included wherein a first set of substrates can be included in the inner region 32, and a second set of substrates can be included in the outer region 36. This can include that the inner region 32 and the outer region 36 each include a single separate substrate.

The coating 40 can be manufactured, configured, or selected to include icephobic material 48 or an icephobic surface, that is, a material or surface having the ability to at least partially repel ice or prevent ice formation. In one non-limiting example, the icephobic material 48 can include icephobic characteristics due to a certain topographical structure of the surface of the material 48; however, additional compositional, configurational, or physical qualities can be included, incorporated into, or otherwise accounted for in the icephobic characteristics of the material 48. The coating 40 can also be disposed upon the propeller blade 18 such that the coating 40 at least partially overlies the substrates 42, 44, 46 along the leading edge 38 of the blade 18.

The coating 40 having the icephobic material 48 can define a fourth color, which can, for example, be different from at least a subset of the first, second, and third substrate 42, 44, 46 colors. In one non-limiting example, the coating 40 can be selected to be visually distinguishable from all of the other substrate 42, 44, 46 colors, or can be clear or semi-transparent, or a combination thereof. When the coating 40 is selected to be semi-transparent, the transparency of the coating 40 can be manufactured, selected, or configured such that the disposition of the coating 40 over the respective substrates 42, 44, 46 at least partially obscures the colors of the corresponding substrates 42, 44, 46.

Figure 3:
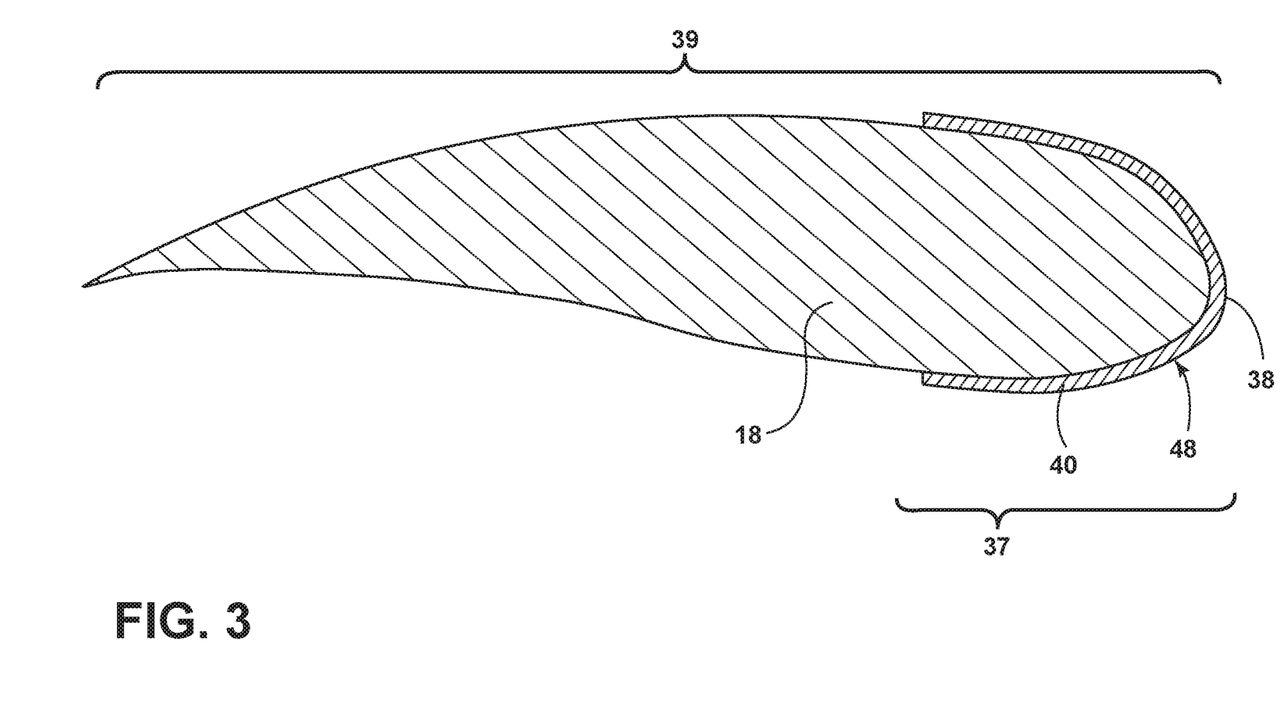
FIG. 3 is a schematic cross-sectional view of the propeller blade, taken along line of FIG. 2, in accordance with various aspects described herein.

FIG. 3 illustrates a cross section view of the propeller blade 18 taken along line of FIG. 2. As shown, the coating 40 extends along the leading edge 38 of the propeller blade 18. By way of non-limiting example, the coating 40 can be disposed upon the leading edge 38 and can extend from the leading edge 38 to a portion 37 of the total chord length 39 of the propeller blade 18. In only non-limiting example, the portion 37 can be approximately twenty-five percent along the total chord length 39 of the blade 18. Alternative lengths of the coating 40 are also contemplated. The cross section view of FIG. 3 has been illustrated to represent one example configuration of the coating 40 relative to the radially outer region 36 of the propeller blade 18. While not shown for brevity, the cross-section view of FIG. 3 can be applicable with respect to the coating 40 applied to the radially inner region 32. Alternatively, embodiments of the disclosure can be included wherein, for example, the amount of coating 40, or the amount of icephobic material 48 varies along the radial length of the propeller blade 18. For example, the thickness of the coating 40 or icephobic material 48 can decrease with the increasing radius of the blade 18 from the blade root 28. In another example, the efficiency of the coating 40 or icephobic material 48 (that is, the ability to reduce, prevent, or shed ice build-up or growth) can increase with the increasing radius of the blade 18 from the blade root 28. In another non-limiting example, the coating 40 can be applied to the propeller blade 18 such that the radially inner region 32 of the propeller blade 18 can reduce, prevent, or shed ice build-up or growth better than the radially outer region 36.

Figure 4:
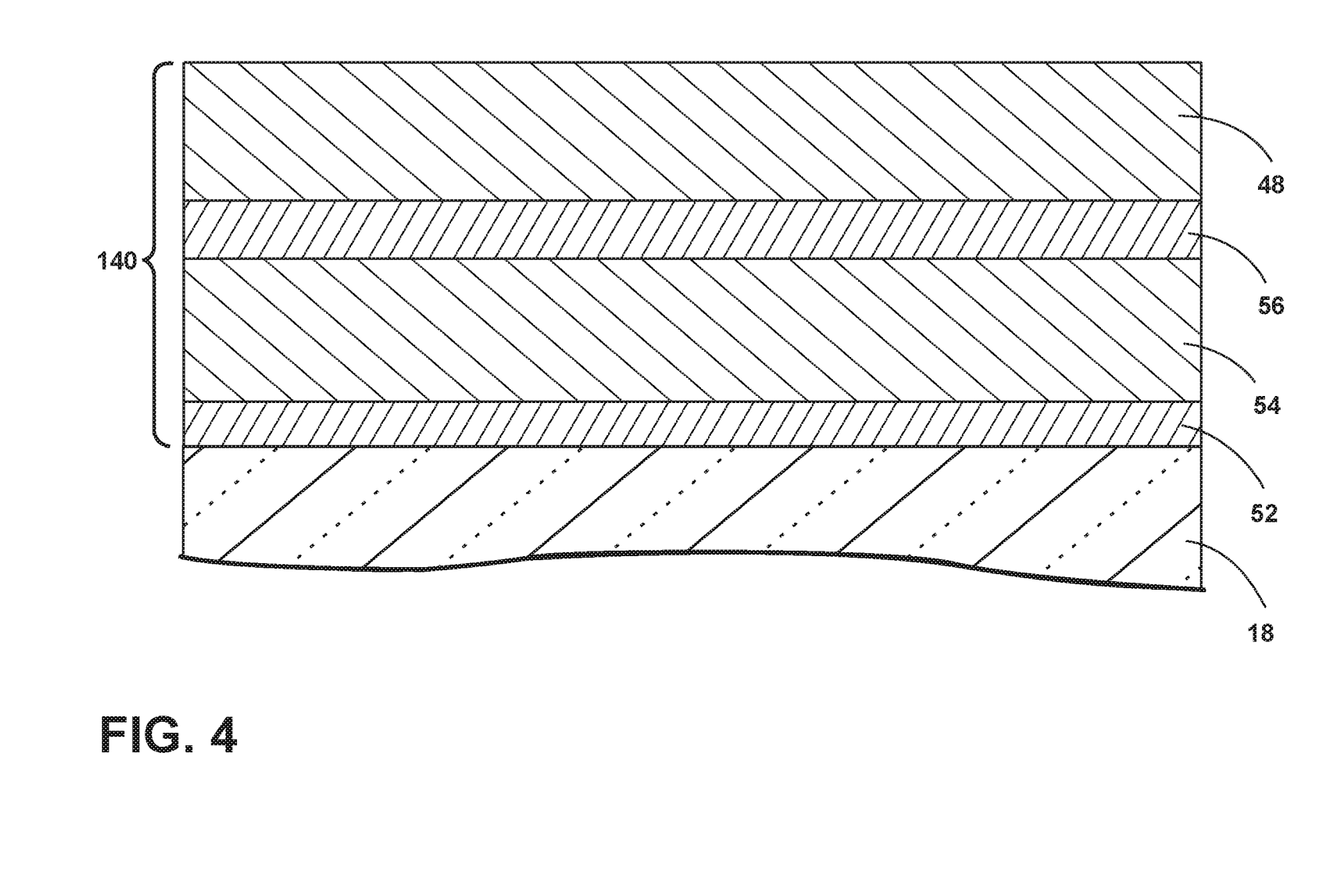
FIG. 4 is a schematic cross-sectional view of layers of an alternative embodiment of the coating on the propeller blade in accordance with various aspects described herein.

FIG. 4 illustrates an alternative example coating 140, wherein the alternative example coating 140 includes a set or arrangement of layers applied to or disposed upon the propeller blade 18. The coating 140 can include a first layer 52 of adhesive provided directly adjacent the surface of the propeller blade 18. A second layer 54 can comprise a polymer, and can be applied to or disposed upon the adhesive layer 52. The second polymer layer 54 can further comprise a set of rubber materials such as neoprene. In one exemplary configuration, the second polymer layer 54 can have a thickness in the range 0.5 millimeter (mm) to 1.0 mm. A third layer 56 can comprise a tie coat, and can be applied to or disposed upon the second layer 54 to provide a suitable surface for bonding the icephobic material 48 to the coating 140. In one example configuration, the third layer 56 can have a thickness on the order of 1 micrometer. In one exemplary configuration, the thickness of the icephobic material 48 layer can be approximately 3 mm. The coating 140 can be applied or otherwise mounted to the propeller blade 18 in any suitable manner. For example, the individual layers 52, 54, 56, 48 of the coating can be independently secured to the propeller blade 18 or the other layers in a sequential manner. Alternatively, a subset of the individual layers 52, 54, 56, 48 can be secured to adjacent layers and then secured to the blade 18.

In example embodiments wherein the first, second, or third substrates 42, 44, 46 are included in the coating 40, 140 the second layer 54 can be colored or configured to include the respective first, second, or third colors. In this sense, the second layer 54 can include the respective first, second, or third substrates 42, 44, 46, depending on the position of the coating 40, 140 with respect to the radial length of the propeller blade 18, as explained herein. In such an instance, the wear or wearing away of the icephobic material 48 layer and the third tie coat layer 56 can expose the second layer 54 to provide an indication of wear of the icephobic material 48 layer. When the first, second, or third substrates 42, 44, 46 are included in the propeller blade 18 (i.e. not in the coating 40, 140), the wear or wearing away of the icephobic material 48 layer, and any other intervening layers, can expose the respective first, second, or third substrates 42, 44, 46 to provide an indication of wear of the icephobic material 48 layer.

Alternatively, embodiments of the disclosure can include a set of identifiable or distinguishable characteristics of the first, second, or third substrates 42, 44, 46, wherein the identifiable or distinguishing characteristics of the substrates 42, 44, 46 are different from the coating 40, 140. In this example, non-limiting exemplary characteristic such as electrical conduction, electrical isolation, capacitance, magnetic strength, or texture can distinguish the substrates 42, 44, 46 from the coating 40, 140 such that wear or wearing away of the icephobic material 48 layer exposes the distinguishing characteristic, compared with the coating 40, 140. In this sense, non-visual indicators or characteristics can be incorporated into the contrasting qualities of the substrates 42, 44, 46 and coating 40, 140.

The radial extent of the coating 40, 140 or icephobic material 48 can be chosen or selected to provide a low cohesion for ice where it is needed, such as relative to the radially inner region 32 of the blade. In contrast, the radially outer region 36 of the propeller blade 18, when rotated, can be subjected to high enough rotational forces to cause ice to self-shed from coated or uncoated portions of the blade surface. Stated another way, the radially outer region 36 can include a portion of the propeller blade 18 wherein the rotational forces on the blade, in use, remove ice from a coated or an uncoated portion of the blade 18.

In another example embodiment, the coating 40, 140 can have a cohesive coefficient which varies along the length of the blade, reflecting the fact that the rotational forces increase linearly with radius. The cohesive coefficient can increase with increasing radius, whereby the radially inner region 32 has the highest propensity for shedding ice. This can be achieved by the use of different icephobic materials 48 along the radial length of the coating 40, 140. In this way, it is possible to reduce the cost of the coating by only using the more costly icephobic materials 48 in the radially inner region 32. Additionally, or alternatively, the thickness of the coating 40, 140 can vary along the total radial length 25 of the propeller blade 18, or the efficiency of the coating 40, 140 or icephobic material 48 can vary with the increasing radius of the blade 18.

During turbo-prop engine 16 operation, ice can accumulate on the propeller blades 18 until such time as the ice mass is sufficient to cause self-shedding under the action of the centrifugal forces on the ice which result from the rotation 22 of the propeller blades 18. The force exerted by the ice mass can be equivalent to the weight of the ice, multiplied by the radial location of the ice on the propeller blade 18, multiplied by the square of the rotational speed of the propeller blade 18. When the centrifugal force of the ice exceeds the cohesive bond strength between the ice and the surface of the propeller blade 18, the ice breaks away from the propeller blade 18. Thus, the amount of ice that has to build up at any specific radius of the propeller blade 18 to overcome the cohesive bond between the ice and the blade also varies. Nearer to the blade tip 30, the centrifugal forces can be high enough to prevent significant build-up of ice without any icephobic material 48 or coating 40, 140.

In one example, the rotational speed of the propeller blade 18 can be of the order of 850 rotations per minute, whereby the centrifugal field outside a radius of 1.39 meters (55 inches) can shed ice from the blade surface without icephobic material 48 or coating 40, 140. Where the acceleration of the ice due to the rotation of the propeller blade 18 exceeds 1100 times the force of gravity, the ice tends to self-shed from the blade surface without any icephobic material 48 or coating 40, 140.

By virtue of the coating 40, 140 being a passive system, if the coating 40, 140 is damaged, worn away, or worn thin, the coating 40, 140 can lose effectiveness in reducing build-up, reducing accumulation, or enabling the shedding of ice. For example, impact(s) from foreign object(s) can wear away, chip, or remove at least a portion of the coating 40, 140, the icephobic material 48, or various layers thereof. Embodiments of the disclosure provide for a propeller blade 18 wherein damage to or wearing away of the icephobic material 48 or the coating 40, 140 can be readily identified by way of a visual inspection due to the contrast of the fourth color (e.g. the coating 40, 140 or icephobic material 48 color) relative to the underlying first, second, or third color (e.g. the colors of the respectively positioned first substrate 42, second substrate 44, or third substrate 46). Stated another way, embodiments of the propeller blade 18 are included wherein the color of the icephobic material 48 or coating 40, 140 is selected to visually indicate wear in the icephobic material 48 or coating 40, 140 by revealing the contrasting color of the substrate 42, 44, 46 underneath. As previously described, the substrates 42, 44, 46 can be included in the propeller blade 18 or the coating 40, 140 itself, for example, as the second layer 54. In embodiments of the disclosure wherein the icephobic material 48 or coating 40, 140 is selected to include a clear or semi-transparent layer, the amount of damage to the icephobic material 48 or coating 40, 140 can be visually indicated or visually identified by revealing at least a portion of the underlying colors, for example, including a color gradient toward the underlying color to indicate the level or amount of wearing or damage.

Embodiments of the disclosure described herein can further include configurations wherein the amount or level of wearing or damage to the icephobic material 48 or coating 40, 140 is visually identifiable or distinguishable between the different substrates 42, 44, 46 when the substrate 42, 44, 46 colors are different. For example, visually identifying the known first color, or a gradient of the known first color, on a portion of the propeller blade 18 indicates the wearing relative to the first substrate 42, compared with visually identifying the known second color, or gradient thereof, indicating the wearing relatives to the second substrate 44.

In this sense, a visualizer, such as a maintenance member can rapidly determine the amount or level of damage or wear to the icephobic material 48 or coating 40, 140 by way of identifying the underlying colors and the location of the damage or wear relative to the length of the propeller blade 18. The visualizer can, for example, compare the amount or level of damage or wear to a visual inspection criteria corresponding with, for example, a predetermined set of icephobic material 48 or coating 40, 140 wear thresholds. In one example embodiment, the visual inspection criteria can include a color chart or card that the visualizer can hold proximate to the damage or wear to visually compare the amount of wear with the criteria or set of wear thresholds. If the comparison of the damage or wear satisfies the criteria or set of wear thresholds, that is, if the damage or wear is more than a threshold amount of wear in the icephobic material 48 or coating 40, 140 such that the efficiency of the material 48 or coating 40, 140 is reduced below a predetermined amount, a maintenance operation action can be initiated to, for example, reapply icephobic material 48 or coating 40, 140 to the worn portion, or removal or replacement of the propeller blade 18 or coating 40, 140.

Embodiments of the disclosure can yet further include multiple visual inspection criteria or sets of wear thresholds corresponding with or relative to the individual substrates 42, 44, 46. For example, the first or second substrates 42, 44, or the corresponding visual inspection criteria can be configured to tolerate or accept a respective first amount of wear and a second amount of wear. In the aforementioned example, the first amount of wear can be different from the second amount of wear. Stated another way, the visual inspection criteria can be different for a subset of the substrates 42, 44, 46 to correspond with a varying level of acceptable wear or damage for the corresponding substrate 42, 44, 46.

Figure 5:
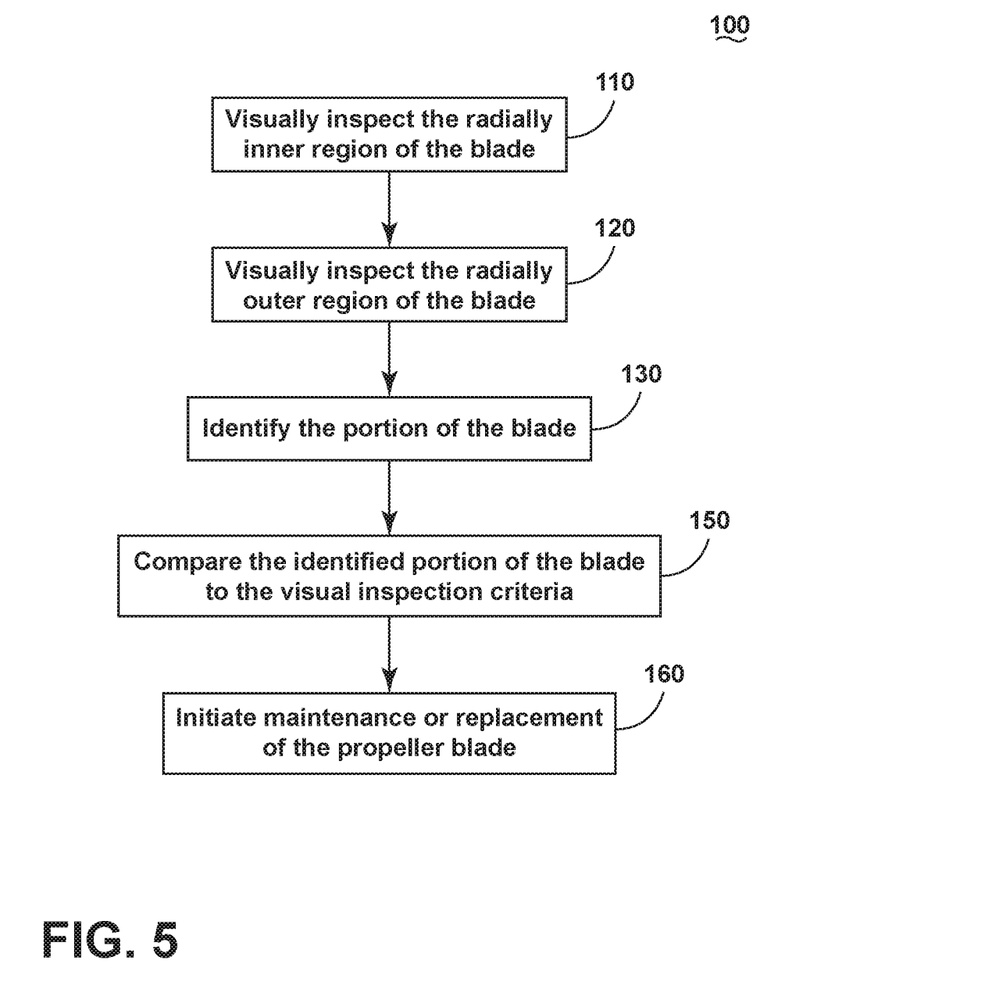
FIG. 5 is an exemplary flow chart diagram of demonstrating a method of inspecting a propeller blade, such as the propeller blade illustrated in FIG. 2, in accordance with various aspects described herein.

FIG. 5 illustrates a flow chart demonstrating a method 100 of inspecting a propeller blade 18. The method 100 begins by inspecting, such as visually inspecting, the radially inner region of the propeller blade at 110 and inspecting, such as visually inspecting, the radially outer region of the blade at 120. The method 100 then proceeds to identify a portion of the propeller blade at 130 wherein a contrasting color corresponding with a known color of an underlying substrate 42, 44, 46 has been revealed. The method 100 can then include comparing the portion of the propeller blade 18 identified at 130 to visual inspection criteria at 150. In embodiments wherein the individual substrates 42, 44, 46 have corresponding individual visual inspection criteria, or wherein a set of worn propeller blade portions are identified, each substrate 42, 44, 46 or worn portion identified can be compared with its respective visual inspection criteria 150. Next, if the comparison of the portion of the propeller blade identified at 130 is determined to satisfy the visual inspection criteria, the method 100 proceeds to initiating at least one of maintenance or replacement of the propeller blade at 160. The term "satisfy" the visual inspection criteria is used herein to mean that the portion of the propeller blade identified satisfies the visual inspection criteria, such as being visually equal to, visually indistinguishable from, or having a color gradient indicating more of the underlying substrate color, compared with a color gradient threshold criteria or a subset of criteria. It will be understood that such a determination may easily be altered to be satisfied by a positive/negative comparison, greater than/less than comparison or a true/false comparison. As described above, maintenance can include reapplying the icephobic material 48 or coating 40 to the identified portions of the propeller blade 18 satisfying the visual inspection criteria.

The sequence depicted is for illustrative purposes only and is not meant to limit the method 100 in any way as it is understood that the portions of the method can proceed in a different logical order, additional or intervening portions can be included, or described portions of the method can be divided into multiple portions, or described portions of the method can be omitted without detracting from the described method. For example, the radially outer region 36 can be inspected prior to the radially inner region 32.

Figure 6:
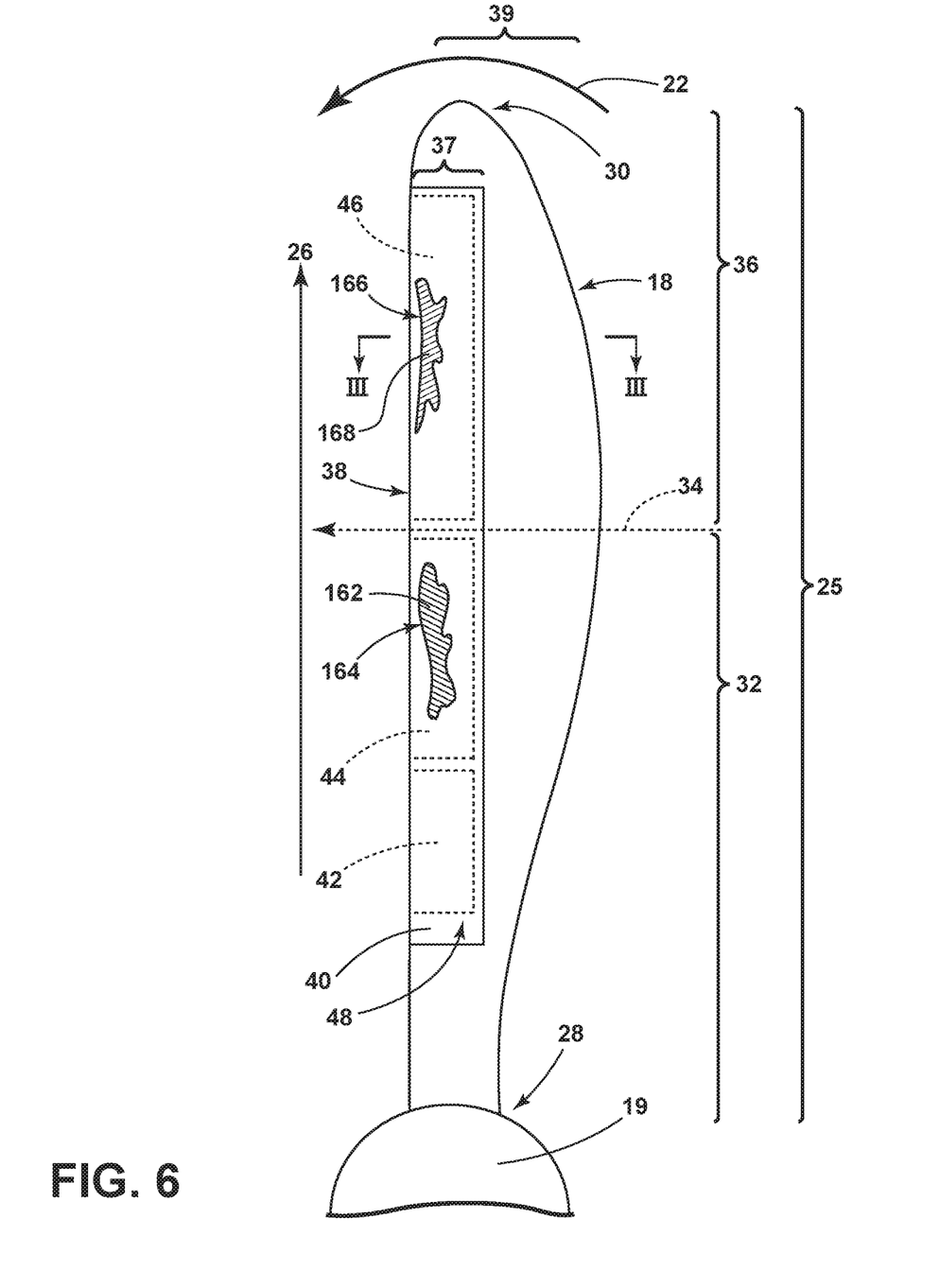
FIG. 6 is a perspective view of the propeller blade illustrated in FIG. 2, showing damage or wear, in accordance with various aspects described herein.

FIG. 6 illustrates an example propeller blade 18 wherein portions of the coating 40, 140 has been damaged or worn away. As shown, damage or wear to a first portion 162 of the coating 40, 140 within the radially inner region 32 reveals or exposes the second substrate 44 having a first identifiable color. Also shown, damage or wear to a second portion 166 of the coating 40, 150 within the radially outer region 36 reveals or exposes the third substrate 46 having a second identifiable color 168. In the illustrated example, the first identifiable color 164, the second identifiable color 168, and the color of the coating 40, 140 can be visually distinguishable from one another. The illustrated example of FIG. 6 is provided for ease of understanding the visual distinctions between the respective first and second identifiable colors 164, 168 and the color of the coating 40, 140. Actual damage or wear to the coating 40, 140 can be different than illustrated.

Many other possible embodiments and configurations in addition to that shown in the above figures are contemplated by the present disclosure. For example, embodiments of the disclosure having non-visual indicators or characteristics can include inspecting the regions of the propeller blade to identify portions of the blade having the non-visual indicator, and wherein the inspection criteria can include measureable qualities or quantities of the non-visual indicators compared with the coating. In this sense, the inspecting or identifying can be accomplished using non-visual cues such as the conductivity, or other examples explained herein. In yet another example, the inspecting or identifying can include utilizing a sensor configured to optically compare a portion of the propeller blade with the inspection criteria and make an automated determination based on the comparison of the sensed or measured reading with the inspection criteria. In one example, the sensor can include an optical sensor configured to sense or measure the color of the portion of the propeller to visually inspect the propeller blade and compare the inspected portion with a visual inspection criteria.

The embodiments disclosed herein provide a propeller blade 18 and method of inspecting a propeller blade 18 wherein wear or damage to the icephobic material or coating can be visually identified based on contrasting colors between the icephobic material or coating color and the underlying substrate color. One advantage that can be realized is that elements of the present disclosure can reduce accumulation or shed accumulation of ice from the propeller blade, by way of the icephobic material, without the need for, or reducing the need or robustness of alternative deicing methods or elements for the propeller blades, such as electrical heaters. By reducing or eliminating the need for electrical heaters, embodiments of the disclosure can reduce the demand on the aircraft electrical system for providing electrical power for propeller deicing. The reduction in the number of required elements in the system gives both technical and commercial benefits, improving reliability and maintainability, and also saving both initial acquisition and ongoing maintenance costs.

The elements of the present disclosure further reduce the cohesive bond strength between the ice and the propeller blade by way of the icephobic material, such that the ice does not accumulate on the propeller blades. By reducing ice accumulation on the propeller blades, the aerodynamic efficiencies of the propellers increase, and the operable range of the aircraft can be improved or increased.

Yet another advantage of the elements of the present disclosure is that wear or damage to the icephobic material or coating can be readily identified by visually inspecting the blade to contrasting or known substrate colors revealed through the coating. The visual inspection can be rapidly completed due to the contrasting colors, and where needed, applicable visual inspection criteria can be referenced and compared with any worn areas of the blade. In yet another benefit, a gradient of substrate color on a portion of the propeller blade can indicate upcoming maintenance, or provide an estimate of when the icephobic material or coating will need to be replaced in the future.

Additionally, as the propeller blade can include multiple substrate portions, having corresponding contrasting substrate colors, the rapid visual inspection can quickly determine which area or portion of the propeller blade includes damage or wear to the icephobic material or coating, and which visual inspection criteria should be applied for comparison. Stated another way, the acceptable levels of wear or damage can vary across the length of the propeller blade and the different colored substrates allow for visually differentiating what inspection criteria is appropriate for the different portions of the blade. Since maintenance members are able to specify and apply different criteria to different portions of the propeller blade, it will be possible to extend propeller blade uptime. Extending propeller blade uptime results in reduced blade maintenance costs and increased productivity for the aircraft.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure. Further, it will be understood that many other possible embodiments and configurations in addition to those shown in the above figures are contemplated by the present disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A propeller blade, comprising:
   a radially inner region located between a propeller blade root and a portion of a length of the propeller blade;
   a radially outer region located between the radially inner region and a propeller blade tip; and
   a coating disposed at least along a leading edge of the propeller blade over the radially inner region and at least a portion of the radially outer region, wherein the coating includes an icephobic material;
   wherein a first substrate portion defining a first color is located within the radially inner region and a second substrate portion defining a second color is located within the radially outer region.

2. The propeller blade of claim 1, wherein the coating includes the first substrate portion or the second substrate portion.

3. The propeller blade of claim 1 wherein the coating further comprises a semi-transparent coating.

4. The propeller blade of claim 3 wherein the semi-transparent coating is selected to visually indicate wear in the icephobic material by revealing at least a portion of one of the first or second colors through the semi-transparent coating corresponding to the wear.

5. The propeller blade of claim 4 wherein the semi-transparent coating is further selected to visually indicate a level of wear in the icephobic material by revealing a visual gradient of one of the first or second colors, wherein the visual gradient indicates the level of wear.

6. The propeller blade of claim 1 wherein the coating extends along an entire length of the propeller blade.

7. The propeller blade of claim 1 wherein the coating further comprises a cohesive coefficient that varies radially along the length of the propeller blade.

8. The propeller blade of claim 7, wherein the cohesive coefficient increases with increasing radius from the propeller blade root.

9. The propeller blade of claim 1, wherein the coating extends from the leading edge of the propeller blade to approximately twenty-five percent along a chord length of the propeller blade.

10. The propeller blade of claim 1, wherein the coating further comprises a set of layers.

11. The propeller blade of claim 10, wherein the coating further comprises at least one of an adhesive layer, a polymer layer, or a neoprene layer in addition to the icephobic material.

12. The propeller blade of claim 10 wherein at least a subset of the set of layers defines at least one of the first substrate or second substrate, and the icephobic material defines a third color, different from the first and second colors and wherein the third color is selected to visually indicate wear in the icephobic material by revealing at least a portion of the first or second color corresponding to the wear.

13. A method of inspecting a propeller blade, comprising:
    inspecting a radially inner region of the propeller blade, located between a blade root and fifty percent of a total length of the propeller blade, wherein the radially inner region of the propeller blade includes an icephobic coating overlying a first substrate having a first color;

inspecting a radially outer region of the propeller blade, located between the radially inner region and a blade tip of the propeller blade, wherein at least a portion of the radially outer region includes the icephobic coating overlying a second substrate having a second color;

identifying a portion of the propeller blade wherein at least one of the first color or the second color has been revealed;

comparing the identified portion of the propeller blade to an inspection criteria; and when the comparison of the identified portion of the propeller blade satisfies the inspection criteria, initiating at least one of a maintenance operation or replacement of the propeller blade.

14. The method of claim 13 wherein the inspection criteria include a visual set of icephobic coating wear thresholds.

15. The method of claim 14 wherein the inspection criteria include a color gradient from the icephobic coating to one of the first color or the second color, and wherein the color gradient corresponds to the set of icephobic coating wear thresholds.

16. The method of claim 14 wherein the inspection criteria further comprise a first visual inspection criteria related to the inner region and a second visual inspection criteria related to the outer region, wherein the first visual inspection criteria and the second visual inspection criteria are different.

17. The method of claim 13 wherein the initiating the maintenance operation includes applying an icephobic coating to the identified portion of the propeller blade.

18. A propeller blade, comprising:

a radially inner region located between a blade root and fifty percent of the total length of the propeller blade;

a radially outer region located between the radially inner region and a blade tip of the propeller blade, where the radially outer region is located on the propeller blade where rotational forces on the propeller blade are sufficient, in use, to remove ice from an uncoated blade; and a coating including an icephobic material disposed at least along a leading edge of the propeller blade over at least a portion of the radially inner region and at least a portion of the radially outer region;

wherein a first substrate portion defining a first color is located within the radially inner region, a second substrate portion defining a second color is located within the radially outer region, and the coating defines a third color, different from the first color and the second color, and wherein the coating is selected to reveal at least one of the first or second colors in response to wear.

19. The propeller blade of claim 18, wherein the coating includes the first substrate portion or the second substrate portion.

20. The propeller blade of claim 18 wherein the coating further comprises a semi-transparent coating.

* * * * *